US010685250B2

(12) United States Patent
Brown

(10) Patent No.: US 10,685,250 B2
(45) Date of Patent: Jun. 16, 2020

(54) LIVENESS DETECTION FOR FACE CAPTURE

(71) Applicant: MorphoTrust USA, LLC, Billerica, MA (US)

(72) Inventor: Timothy J. Brown, Tampa, FL (US)

(73) Assignee: MorphoTrust USA, LLC, Billerica, MA (US)

( * ) Notice: Subject to any disclaimer, the term of this patent is extended or adjusted under 35 U.S.C. 154(b) by 0 days.

(21) Appl. No.: 15/604,392

(22) Filed: May 24, 2017

(65) Prior Publication Data

US 2017/0344840 A1 Nov. 30, 2017

Related U.S. Application Data

(60) Provisional application No. 62/340,835, filed on May 24, 2016.

(51) Int. Cl.
*G06K 9/00* (2006.01)

(52) U.S. Cl.
CPC ..... *G06K 9/00906* (2013.01); *G06K 9/00255* (2013.01); *G06K 9/00288* (2013.01); *G06K 9/00604* (2013.01); *G06K 9/00617* (2013.01)

(58) Field of Classification Search
None
See application file for complete search history.

(56) References Cited

U.S. PATENT DOCUMENTS

| 8,856,541 | B1* | 10/2014 | Chaudhury | G06F 21/32 |
| | | | | 382/115 |
| 2004/0156554 | A1 | 8/2004 | McIntyre | |
| 2014/0289834 | A1 | 9/2014 | Lindemann | |
| 2015/0256528 | A1 | 9/2015 | Turgeman | |
| 2016/0004303 | A1 | 1/2016 | Arar et al. | |
| 2016/0140390 | A1 | 5/2016 | Ghosh et al. | |
| 2017/0054987 | A1* | 2/2017 | Rangarajan | H04N 19/167 |
| 2017/0061251 | A1* | 3/2017 | Fan | G06K 9/6267 |
| 2017/0185760 | A1* | 6/2017 | Wilder | G06F 21/36 |

OTHER PUBLICATIONS

International Search Report and Written Opinion in International Application No. PCT/US17/34333, dated Aug. 29, 2017, 10 pages.

* cited by examiner

*Primary Examiner* — David Perlman
(74) *Attorney, Agent, or Firm* — Fish & Richardson P.C.

(57) ABSTRACT

Methods, systems, and apparatus, including computer programs encoded on a computer storage medium, for liveness detection are disclosed. In one aspect, a method includes the actions of providing, for display on a screen to a user, a graphical item that travels along a path. The actions further include tracking a movement of an eye of the user while the graphical item travels along the path on the screen. The actions further include comparing the movement of the eye of the user to the path traveled by the graphical item. The actions further include generating an eye correlation score that reflects a correlation between the movement of the eye of the user and the path traveled by the graphical item. The actions further include determining whether the eye correlation score satisfies an eye liveness threshold score. The actions further include determining whether the user is a live person.

22 Claims, 6 Drawing Sheets

FIG. 3

LIVENESS DETECTION FOR FACE CAPTURE

CROSS REFERENCE TO RELATED APPLICATION

This application claims the benefit of U.S. Application No. 62/340,835, filed on May 24, 2016, which is incorporated by reference.

FIELD

This specification relates to user verification and authentication.

BACKGROUND

Facial recognition may be used to identify or verify a person from a digital image or video frame. A system performing facial recognition may verify the person by comparing selected facial features from the image to facial features from images in a database.

SUMMARY

The subject matter described in this application describes an approach to liveness detection for face capture. In some implementations, a liveness system may detect liveness from a pre-set group of dictated movements (e.g., ask the subject to move their head to the right, left, up, etc.). In some implementations, a liveness detection system introduces random motion on the screen using an on screen element that forces the user's eyes or head or both eyes and head to track the moving object. Using eye tracking and/or head tracking, the liveness detection system can determine if the eyes and/or head of the subject are indeed tracking the object and if so, are indeed a live subject.

The liveness detection system utilizes a method for ensuring face 'liveness'. That is a human subject is providing a face biometric and the system is not being spoofed by a printed picture or video of the human subject. The method may include the following actions. While a user is looking at the screen of a device and attempting to prove liveness, a graphic indicator is introduced to the screen (e.g., a house fly). The house fly graphic begins to move in a random motion around the screen. The subject is asked to track the fly around the screen. Using eye tracking, the system estimates the accuracy of the tracking over the course of several seconds, and formulate a liveness score, or correlation score. The liveness score is used to compare to a known threshold. At or above the threshold and the subject is considered "live." Below the threshold, the subject is fake.

According to an innovative aspect of the subject matter described in this application, a method for liveness detection includes the actions of providing, for display on a screen to a user, a graphical item that travels along a path; tracking a movement of an eye of the user while the graphical item travels along the path on the screen; comparing the movement of the eye of the user to the path traveled by the graphical item; based on comparing the movement of the eye of the user to the path traveled by the graphical item, generating an eye correlation score that reflects a correlation between the movement of the eye of the user and the path traveled by the graphical item; determining whether the eye correlation score satisfies an eye liveness threshold score; and based on determining whether the eye correlation score satisfies the eye liveness threshold score, determining whether the user is a live person.

These and other implementations can each optionally include one or more of the following features. The action of determining whether the eye correlation score satisfies an eye liveness threshold score includes determining that the eye correlation score satisfies the eye liveness threshold score. The action of determining whether the user is a live person includes determining that the user is a live person based on determining that the eye correlation score satisfies the eye liveness threshold score. The action of determining whether the eye correlation score satisfies an eye liveness threshold score includes determining that the eye correlation score does not satisfy the eye liveness threshold score. The action of determining whether the user is a live person includes determining that the user is not a live person based on determining that the eye correlation score does not satisfy the eye liveness threshold score. The path traveled by the graphical item is a random path. The actions further include tracking a movement of a head of the user while the graphical item travels along the path; comparing the movement of the head of the user to the path traveled by the graphical item; based on comparing the movement of the head of the user to the path traveled by the graphical item, generating a head correlation score that reflects a correlation between the movement of the head of the user and the path traveled by the graphical item; and determining whether the head correlation score satisfies a head liveness threshold score. The action of determining whether the user is a live person is based further on determining whether the head correlation score satisfies the head liveness threshold score. The graphical item travels continuously along the path. The graphical item travels along the path stopping at particular points along the path.

Other implementations of this aspect include corresponding systems, apparatus, and computer programs recorded on computer storage devices, each configured to perform the operations of the methods.

The subject matter described in this application may have one or more of the following advantages. A system may verify that an image of a person's face is that of a live person.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 illustrates an example of a computing device and a mobile computing device.

DETAILED DESCRIPTION

Figure 1A:
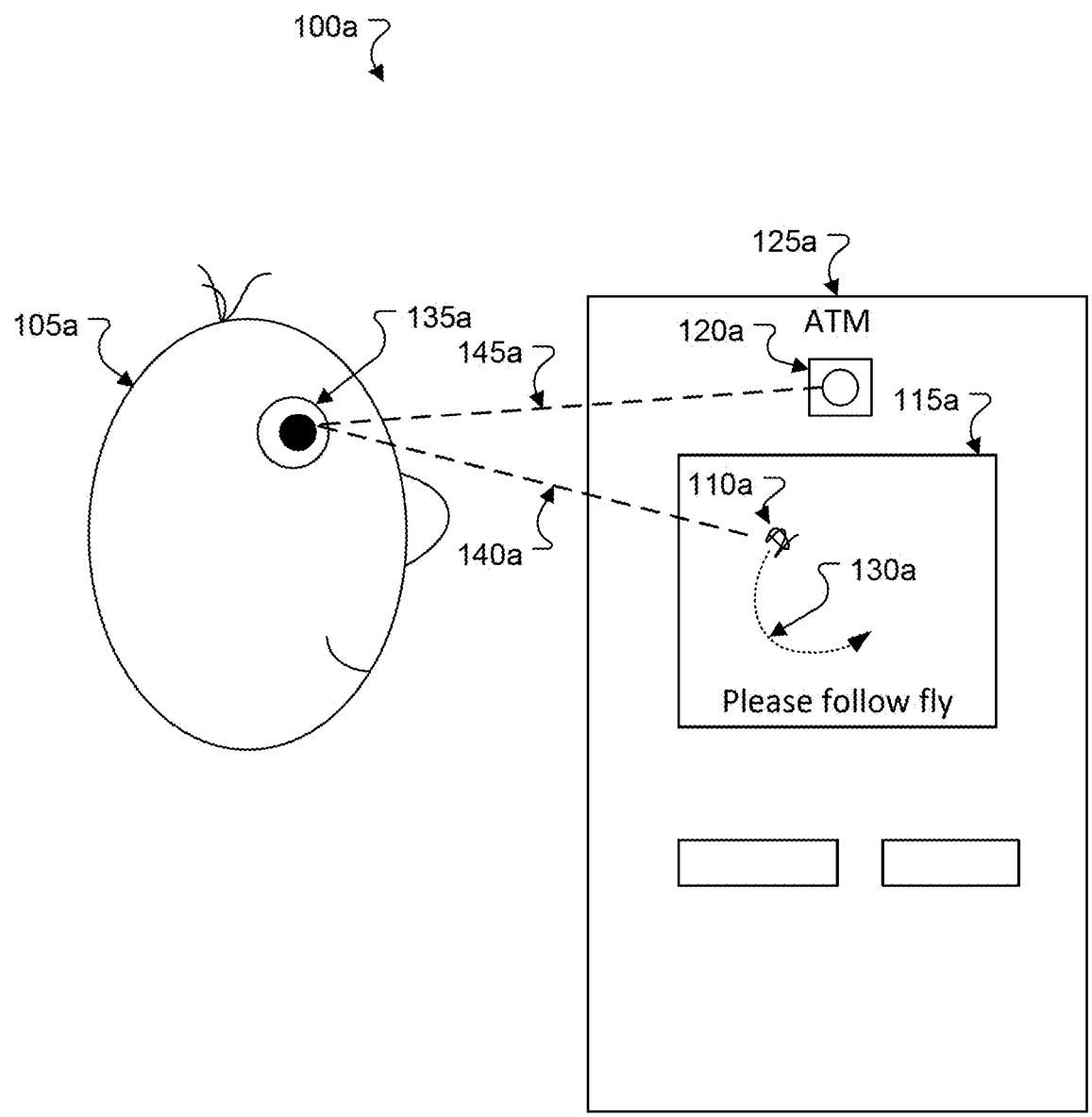
FIG. 1A illustrates a user following a moving graphical item on a display screen while a sensor tracks the user's eye movement.

FIG. 1A illustrates a user 105a following a moving graphical item 110a on a display screen 115a while a sensor 120a tracks the user's eye movement. In the illustrated example, the user 105a is using an ATM 125a. The ATM 125a may be programmed only to operate when it detects a live person in front of the ATM 125a. The ATM uses the sensor 120a to track the eye movement of the user 105a as the graphical item 110a travels along the path 130a.

When the user 105a is beginning to use the ATM 125a, the user 105a approaches the ATM 125a and may scan a bank card and enter a PIN. The user 105a selects an action on the display screen 115a such as withdraw cash from the checking account. The ATM 125a verifies the transaction and dispenses the cash. In some implementations, during the verification process, the ATM 125a may display a moving graphical item 110a on the screen 115a as a test to determine whether the person in front of the ATM 125a is a live person or instead a photo of a person or a video. The ATM 125a may display the moving graphical item 110a at other times during the transaction such as after the user enters a PIN, after the user swipes the bank card, or before the user swipes the bank card.

The ATM 125a displays the graphical item 110a on the screen 115a and moves the graphical item 110a around the screen 115a along a predetermined path 130a. In some implementations, the path 130a is generated randomly by the ATM 125a. In this instance, the ATM 125a stores the path 130a of the graphical item 115a as it travels randomly across the screen 115a. The graphical item 110a may be any item that catches the user's interest such as a cluster of flickering pixels or an image of a bug. In some implementations, the ATM 125a presents instructions to the user 105a to follow the graphical item 110a. For example, the ATM may display, "Please follow the bug around the screen." In some implementations, the ATM 125a displays the graphical item 110a while requesting the user 105a perform another activity. In this instance the graphical item 110a is distracting enough that the user 105a naturally follows it. For example, the ATM 125a may be requesting the user to enter the amount of cash to withdrawal. While the request is on the screen 115a, the ATM displays the graphical item 110a on the screen 115a and moves the graphical item 110a along the path 130a.

As the graphical item 110a moves along the path 130a, the user's eye 135a follows the graphical item 110a as represented by line of sight 140a. While the graphical item 110a is moving along the path 115a, the ATM 125a uses the sensor 120a to track the movement of the user's eye 135a through the line of sight 145a. In some implementations, the sensor 120a may be a camera that provides images to the ATM 125a. The ATM 125a then analyzes the images to determine a path of the eye 135a.

Once the ATM determines the path of the eye 135a, the ATM 125a compares the path of the eye 135a to the path 130a of the graphical item 110a and computes a correlation score of the two paths. If the correlation score satisfies a threshold, then the ATM 125a determines that the user 105a is a live person. For example, if the correlation score is above the threshold, then the user 105a is a live person. If the correlation score is below a threshold, then the user 105a is not a live person.

Figure 1B:
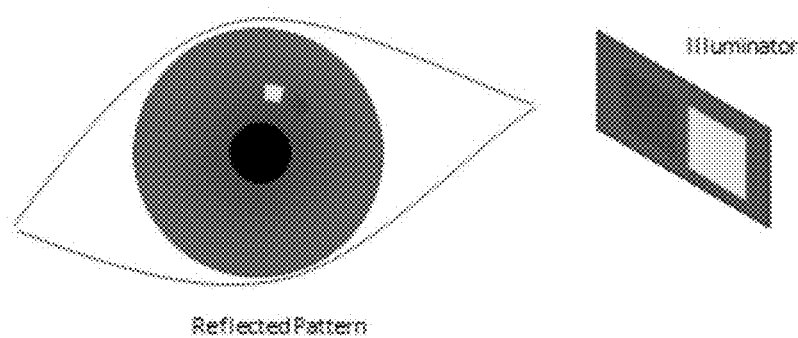
FIG. 1B illustrates an example illuminator and sensor that are configured to track eye movement.

FIG. 1B illustrates an example illuminator and sensor that are configured to track eye movement. The illuminator projects light that is reflected by the user's eye. The sensor detects the reflected light and tracks the location of the reflection. In some implementations, the sensor may detect a feature of the user's eye such as the pupil or an eye lid and track the distance between the reflected light and the feature. In some implementations, the illuminator projects visible light. In some implementations, the illuminator projects non-visible light such as infrared.

Figure 1C:
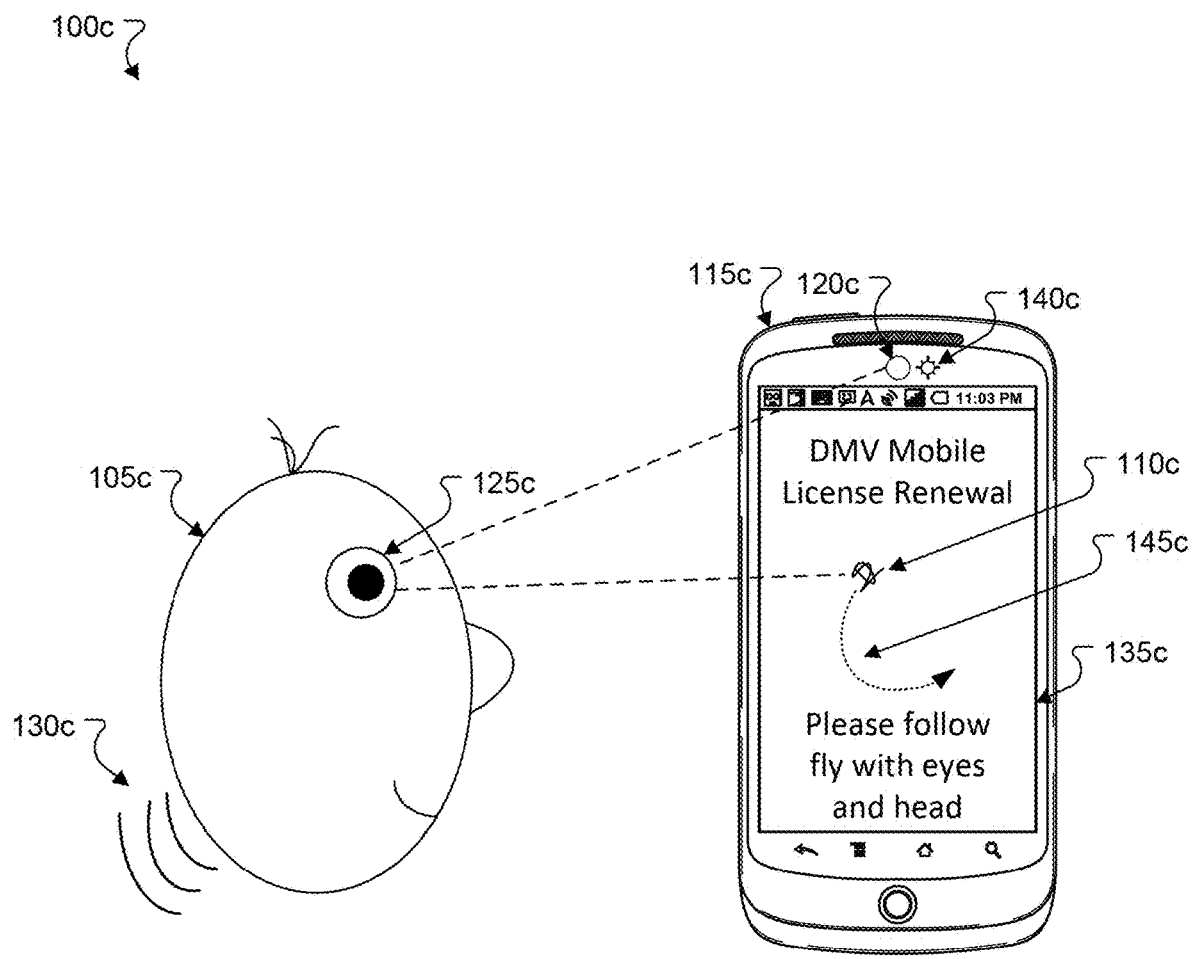
FIG. 1C illustrates a user following a moving graphical item on a mobile device while a sensor tracks the user's eye and head movement.

FIG. 1C illustrates an example system 100c of a user 105c following a moving graphical item 110c on a mobile device 115c while a sensor 120c tracks the user's eye and head movement. Briefly, and as describe in more detail below, the system 100c presents a graphical item 110c on a user interface 135c. The graphical item 110c moves around the user interface 135c. The user 105c follows the graphical item 110c, and the 120c tracks the user's eye and head movement. Based on the correlation between the user's eye and head movement and the path of the graphical item, the system 100c determines whether the user 105c is a live person.

As illustrated in FIG. 1C, the user 105c is using the mobile device 115c to renew the user's driver's license. For security purposes, the DMV need to verify that the user 105c is a real person and not a picture of the user 105c. The DMV may use facial recognition to authenticate the user 105c before capturing a new image of the user 105c for an updated driver's license. If a nefarious actor presents a picture of the user 105c, then the actor may spoof the DMV into believing that the actor represents the user 105c. By performing eye tracking and head tracking, the DMV system may verify that the image of the user 105c is that of a live person and not a picture of the user 105c.

The user 105c initiates the DMV license renewal application or visits the license renewal website. To verify the liveness of the user 105c, the application may present, on the user interface 135c, a graphical item 110c that moves along a random path 145c. The application may also present instructions on the user interface 135c for the user 105c to follow the graphical item with the user's eyes and head.

As the graphical item moves along the path 145c, the illuminator 140c illuminates the user's eyes 125c. The illuminator 140c may project visible light or infrared light. In some implementations, the user interface 135c provides the illumination for the eye. The graphical item 110c may be a bright spot on a dark screen. The sensor 120c captures a series of images, or a video of the user 105c while the graphical item 110c is moving along the path 145c. The mobile device 115c may provide the images or video to the DMV server for further processing to compare the eye movement and head movement 130c to the path 145c.

In some implementations, the mobile device 115c may not have an illuminator on the front of the mobile device 115c. In this instance, the sensor 120c may begin capturing images, and the mobile device may flash the screen. The reflection of the screen may appear in the user's eye 125c.

The server may identify the user's eye 125c in the images or video based on image recognition and/or the reflection of the illuminator 140c. In instances where the mobile device 115c flashed the screen, the server may identify the eye 125c based on the reflection and/or on image recognition. The server may generate a path of the eye 125c based on tracking the movement of the eye 125c.

The server may also identify the user's head in the images or video based on image recognition. The server may generate a path of the user's head by following the user's head movement 130c. The server may generate an eye correlation score and a head correlation score by comparing the path 145c with the path of the user's eye and the path of the user's head. The server determines whether the user 105c is a live person based on the eye correlation score and a head correlation score. The mobile device 105c may capture an image of the user 105c for the user's new driver's license upon determining that the user 105c is a live person.

In some implementations, the mobile device 115c may be replaced by a desktop computer or laptop computer that operates in generally the same manner as the mobile device 115c. The computer may have an integrated or attached webcam that is configured to capture images. The computer may display the graphical item 110c on the screen of the computer. The computer may track the user's eye and/or head movement in images captured by the webcam, and determine liveness based on a comparison between the user's eye and/or head movement and the path of the graphical item 110c.

Figure 2A:
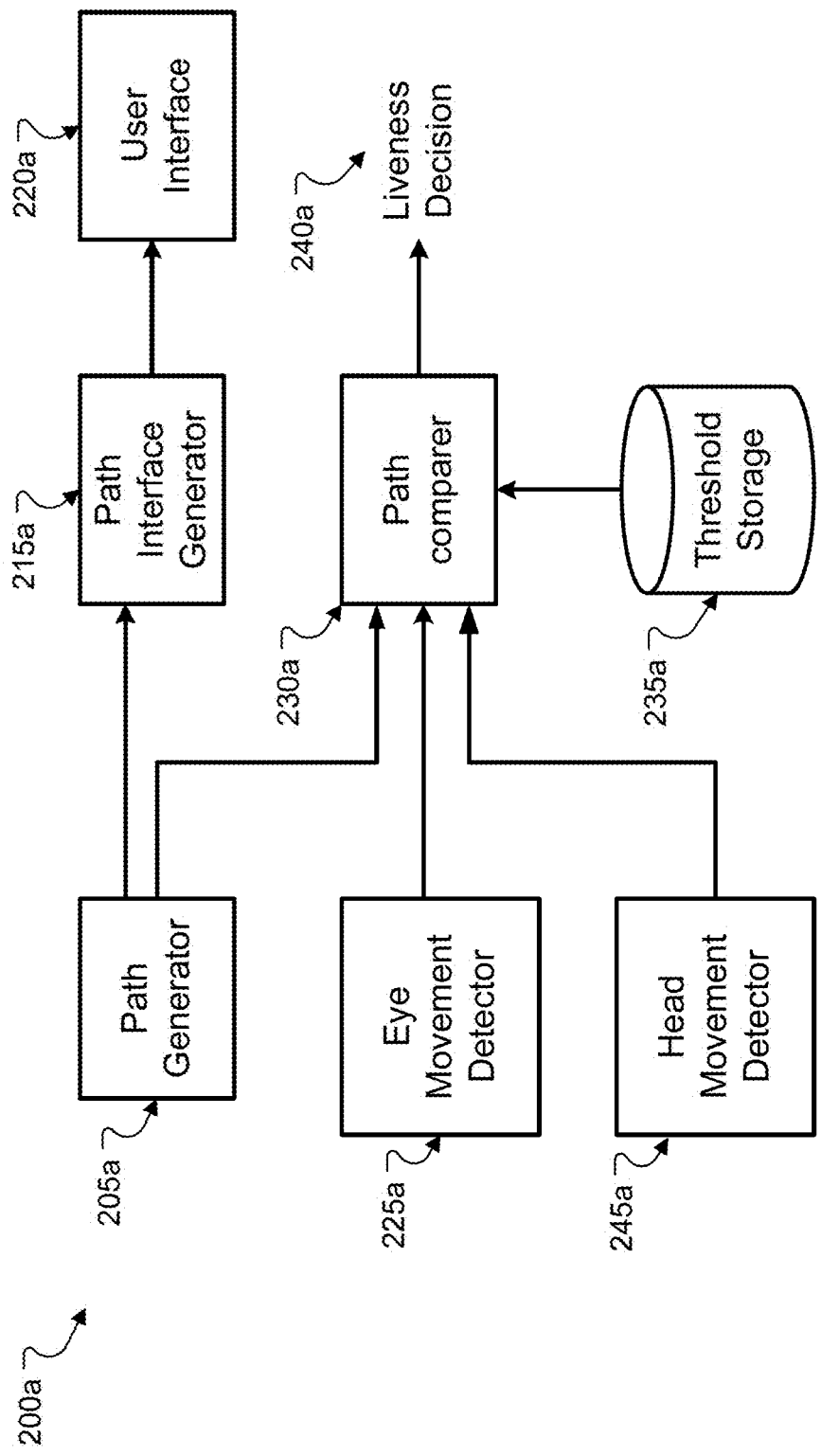
FIG. 2A illustrates example system that tracks a user's eye movement to determine liveness.

FIG. 2A illustrates example system 200a that tracks a user's eye movement. Briefly, and as described in more detail below, the system 200a presents a user a graphical item on a user interface. The graphical item moves around the user interface and the user instinctively, or as requested, follows the graphical item around the screen. Based on the correlation between the user's eye movement and the path of the graphical item, the system 200a determines whether the user is a live person.

The system includes a path generator 205a generates a random path. In some implementations, the path generator 205a may access a path from a path storage. The paths may represent different movement patterns along a screen. For example, one movement pattern may be a circular pattern around the screen. Another pattern may be a crisscross pattern. For a random path, path interface generator 215a may use a random number generator to create a path. The path interface generator 215a uses the path received from the path generator 205a to move a graphical item around the user interface 220a. In some implementations, the path interface generator 215a may include instructions for the user to follow the graphical item to the user interface. In some implementations, the path interface generator 215a may provide data to display the moving graphical item while the system 200a is displaying other information on the user interface 220a.

While the user interface 220a displays the graphical item, the eye movement detector 225a tracks the movement of the user in front of the system 200a. The eye movement 225a may be a camera that takes images at a particular interval such as ten times per second. The eye movement detector 225a may analyze the images to determine a path of the user's eye during displaying of the graphical item. The eye movement detector 225a may also be another type of sensor that physically tracks the movement of the user's eye. The eye movement detector 225a may then generate a path based on the movement of the eye movement detector 225a. In some implementations, the eye movement detector 225a only tracks one eye, for example, the user's right eye. In other implementations, the eye movement detector 225a randomly selects an eye to track.

The eye movement detector 225a provides the eye path to the path comparer 230a. The path comparer 230a also receives the selected path from the path generator 205a. In instances where the path interface generator 215a randomly generate a path, the path interface generator 215a provides the path to the path comparer. The path comparer 230a selects a threshold from the threshold storage 235a and compares the threshold to a correlation score that represents how well the user's eye movement tracked the graphical item. If the correlation score satisfies a threshold, then the liveness decision 240a is that the user is a live person. If the correlation score does not satisfy the threshold, then the liveness decision 240a is that the user is not a live person.

The path comparer 230a may select a threshold from the threshold storage 235a based on the application and the needed certainty that the user is a live person. For example, an ATM may require a higher correlation score than the user is a live person rather than a ticket sales machine. The path comparer 230a may also select a threshold based on the complexity of the path of the graphical item. For example, if the path is a circle that the graphical item travels along, then the path comparer 230a may require a higher correlation score than if the path was a random path. The path comparer 230a may also select a threshold based on the timing of the graphical item movement. For example, if the graphical item was presented along with instructions to follow the graphical item around the screen, then the path comparer 230a may require a higher correlation score than if the graphical item was presented while the user was requested to do something else.

In some implementations, the path comparer 230a receives feedback from another liveness detection portion of the system 200a. The path comparer 230a compares the liveness decision from the other portion and adjusts and trains the thresholds accordingly. For example, if a particular path from the path storage 210a is difficult for a user to follow, then the liveness decision may typically be that the user is not an actual person. The liveness decision from the other portion of the system 200a may indicate that the user is an actual portion. In this instance, the path comparer 230a may decrease the threshold to avoid the error.

In some implementations, the system 200a is trained with samples that are known to correspond to live users and not live users. The samples may include paths followed by the graphical item, paths followed by the user's eyes, and data indicating whether the person is an actual person. The system 200a may use this data to generate the thresholds for the threshold storage 235a and train the path comparer 230a.

In some implementations, the system 200a includes a head movement detector 245a. The head movement detector 245a may be configured to detect the movement of the user's head as the graphical item follows the path on the user interface 200a. The head movement detector 245a may provide data that corresponds to the path traveled by the user's head to the path comparer 230a. The path comparer 230a may compare both the path of the user's eyes and the path of the user's head to determine either separate correlation scores or a combined correlation score. The path comparer 230a may compare the separate correlation scores or a combined correlation score to either separate thresholds or a combined threshold and determine a liveness decision 240a based on the comparison.

Figure 2B:
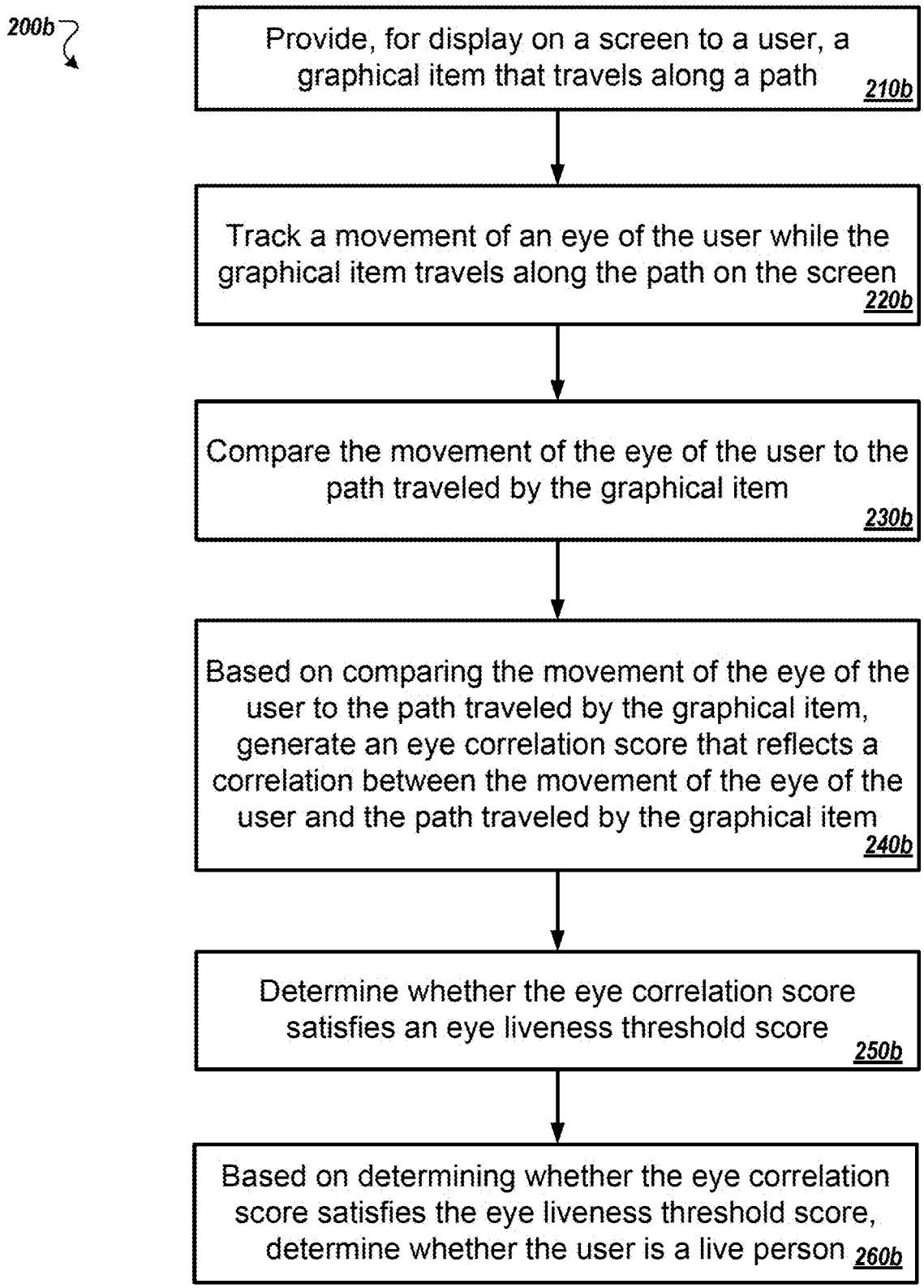
FIG. 2B illustrates an example process for tracing a user's eye movement to determine liveness.

FIG. 2B illustrates an example process 200b for tracing a user's eye movement to determine liveness. In general, the process 200b presents a graphical item that moves along a path. A user follows the graphical item with the user's eyes. The process 200b tracks the user's eye movement to determine whether the user is a live person. The process 200b will be described as being performed by a computer system comprising one or more computers, for example, the system 100a as shown in FIG. 1A, the system 100c as shown in FIG. 1C, or the system 200a as shown in FIG. 2A.

The system provides, for display on a screen to a user, a graphical item that travels along a path (210b). For example, the system may display the graphical item on a screen of an ATM or a mobile device. In some implementations, the path is a predetermined path that is selected from a group of paths. In some implementations, system generates a random path.

The system tracks a movement of an eye of the user while the graphical item travels along the path on the screen (220b). In some implementations, the graphical item travels continuously along the path. In some implementations, the graphical item travels along the path and stops at points along the path. The system may select the stopping points at random, or the stopping points may be predetermined. In some implementations, the system illuminates the user's eyes using a light source. The light source may be visible light or infrared light. The system may track the reflection of the light source from the user's eye. In some implementations, the graphical item may provide the illumination. For example, the graphical item may be a bright spot on a dark screen.

The system compares the movement of the eye of the user to the path traveled by the graphical item (230b). The system, based on comparing the movement of the eye of the user to the path traveled by the graphical item, generates an eye correlation score that reflects a correlation between the movement of the eye of the user and the path traveled by the graphical item (240b).

The system determines whether the eye correlation score satisfies an eye liveness threshold score (250b). In some implementations, the eye correlation score satisfies an eye liveness threshold score if the eye correlation score is greater than the eye liveness threshold score. For example, the eye correlation score is 0.8 and the eye liveness threshold score is 0.7. In some implementations, the eye correlation score does not satisfy an eye liveness threshold score if the eye correlation score is less than the eye liveness threshold score. For example, the eye correlation score is 0.5, and the eye liveness threshold score is 0.7.

The system, based on determining whether the eye correlation score satisfies the eye liveness threshold, determines whether the user is a live person (260b). In some implementations, the system determines that the user is likely a live person if the eye correlation score is greater than the eye liveness threshold score. In some implementations, the system determines that the user is likely not a live person if the eye correlation score is less than the eye liveness threshold score.

In some implementations, the system tracks the movement of a head of the user while the graphical item moves along the path. For example, the system may request that the user moves the user's head as the graphical item moves to the lower right corner. The system may determine that the user is a live person if the user moves the user's head down and to the right. The system may determine a head correlation score that reflects a correlation between the movement of the user's head and the movement of the graphical item. The system may also factor in the timing of the user's head movements compared to any pauses and movements of the graphical item.

The system may compare the head correlation score to a head liveness threshold score. The system may base the liveness decision further on whether the head correlation score satisfies the head liveness threshold score. The system may determine that the user is a live person if both the head correlation score satisfies the head liveness threshold score and the eye correlation score satisfies the eye liveness threshold score. In some implementations, the system may combine the head correlation score and the eye correlation score and compare the combination to a combined eye liveness threshold score and head liveness threshold score. The liveness decision may be based on the comparison of the score combinations.

Figure 3:
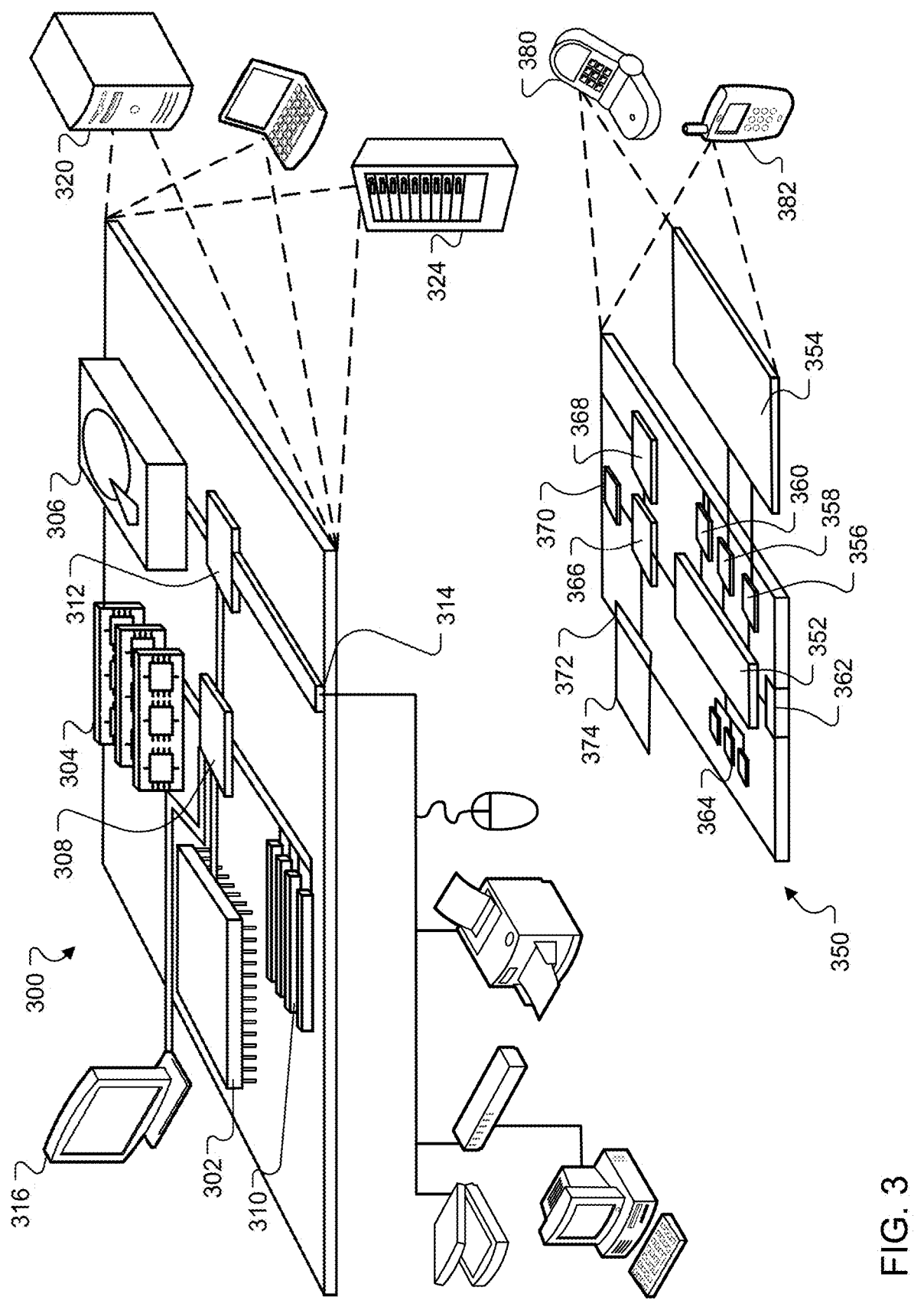

FIG. 3 shows an example of a computing device 300 and a mobile computing device 350 that can be used to implement the techniques described here. The computing device 300 is intended to represent various forms of digital computers, such as laptops, desktops, workstations, personal digital assistants, servers, blade servers, mainframes, and other appropriate computers. The mobile computing device 350 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 300 includes a processor 302, a memory 304, a storage device 306, a high-speed interface 308 connecting to the memory 304 and multiple high-speed expansion ports 310, and a low-speed interface 312 connecting to a low-speed expansion port 314 and the storage device 306. Each of the processor 302, the memory 304, the storage device 306, the high-speed interface 308, the high-speed expansion ports 310, and the low-speed interface 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as a display 316 coupled to the high-speed interface 308. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 304 stores information within the computing device 300. In some implementations, the memory 304 is a volatile memory unit or units. In some implementations, the memory 304 is a non-volatile memory unit or units. The memory 304 may also be another form of computer-readable medium, such as a magnetic or optical disk.

The storage device 306 is capable of providing mass storage for the computing device 300. In some implementations, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 302), perform one or more methods, such as those described above. The instructions can also be stored by one or more storage devices such as computer- or machine-readable mediums (for example, the memory 304, the storage device 306, or memory on the processor 302).

The high-speed interface 308 manages bandwidth-intensive operations for the computing device 300, while the low-speed interface 312 manages lower bandwidth-intensive operations. Such allocation of functions is an example only. In some implementations, the high-speed interface 308 is coupled to the memory 304, the display 316 (e.g., through a graphics processor or accelerator), and to the high-speed expansion ports 310, which may accept various expansion cards. In the implementation, the low-speed interface 312 is coupled to the storage device 306 and the low-speed expansion port 314. The low-speed expansion port 314, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. In addition, it may be implemented in a personal computer such as a laptop computer 322. It may also be implemented as part of a rack server system 324. Alternatively, components from the computing device 300 may be combined with other components in a mobile device, such as a mobile computing device 350. Each of such devices may contain one or more of the computing device 300 and the mobile computing device 350, and an entire system may be made up of multiple computing devices communicating with each other.

The mobile computing device 350 includes a processor 352, a memory 364, an input/output device such as a display 354, a communication interface 366, and a transceiver 368, among other components. The mobile computing device 350 may also be provided with a storage device, such as a micro-drive or other device, to provide additional storage. Each of the processor 352, the memory 364, the display 354, the communication interface 366, and the transceiver 368, are interconnected using various buses, and several of the components may be mounted on a common motherboard or in other manners as appropriate.

The processor 352 can execute instructions within the mobile computing device 350, including instructions stored in the memory 364. The processor 352 may be implemented as a chipset of chips that include separate and multiple analog and digital processors. The processor 352 may provide, for example, for coordination of the other components of the mobile computing device 350, such as control of user interfaces, applications run by the mobile computing device 350, and wireless communication by the mobile computing device 350.

The processor 352 may communicate with a user through a control interface 358 and a display interface 356 coupled to the display 354. The display 354 may be, for example, a TFT (Thin-Film-Transistor Liquid Crystal Display) display or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may provide communication with the processor 352, so as to enable near area communication of the mobile computing device 350 with other devices. The external interface 362 may provide, for example, for wired communication in some implementations, or for wireless communication in other implementations, and multiple interfaces may also be used.

The memory 364 stores information within the mobile computing device 350. The memory 364 can be implemented as one or more of a computer-readable medium or media, a volatile memory unit or units, or a non-volatile memory unit or units. An expansion memory 374 may also be provided and connected to the mobile computing device 350 through an expansion interface 372, which may include, for example, a SIMM (Single In Line Memory Module) card interface. The expansion memory 374 may provide extra storage space for the mobile computing device 350, or may also store applications or other information for the mobile computing device 350. Specifically, the expansion memory 374 may include instructions to carry out or supplement the processes described above, and may include secure information also. Thus, for example, the expansion memory 374 may be provide as a security module for the mobile computing device 350, and may be programmed with instructions that permit secure use of the mobile computing device 350. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 352), perform one or more methods, such as those described above. The instructions can also be stored by one or more storage devices, such as one or more computer- or machine-readable mediums (for example, the memory 364, the expansion memory 374, or memory on the processor 352). In some implementations, the instructions can be received in a propagated signal, for example, over the transceiver 368 or the external interface 362.

The mobile computing device 350 may communicate wirelessly through the communication interface 366, which may include digital signal processing circuitry where necessary. The communication interface 366 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 368 using a radio-frequency. In addition, short-range communication may occur, such as using a Bluetooth, WiFi, or other such transceiver. In addition, a GPS (Global Positioning System) receiver module 370 may provide additional navigation- and location-related wireless data to the mobile computing device 350, which may be used as appropriate by applications running on the mobile computing device 350.

The mobile computing device 350 may also communicate audibly using an audio codec 360, which may receive spoken information from a user and convert it to usable digital information. The audio codec 360 may likewise generate audible sound for a user, such as through a speaker, e.g., in a handset of the mobile computing device 350. Such sound may include sound from voice telephone calls, may include recorded sound (e.g., voice messages, music files, etc.) and may also include sound generated by applications operating on the mobile computing device 350.

The mobile computing device 350 may be implemented in a number of different forms, as shown in the figure. For example, it may be implemented as a cellular telephone 380. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
providing, for display on a screen to a user, a graphical item that travels along a path;
based on providing, for display on the screen, the graphical item, activating a light source (i) that projects light in a direction away from the screen and (ii) that is separate from the screen;
receiving, from a camera, video data that includes a representation of the user;
tracking a reflection of the light source in the video data while the graphical item travels along the path on the screen;
comparing the movement of the reflection of the light source to the path traveled by the graphical item;
based on comparing the movement of the reflection of the light source to the path traveled by the graphical item, generating a correlation score that reflects a correlation between the movement of the reflection of the light source and the path traveled by the graphical item;
determining a level of accuracy that is required for determining whether the user is a live person;
based on (i) the level of accuracy that is required for determining whether the user is a live person and (ii) a complexity of the path traveled by the graphical item or whether other objects or instructions where displayed on the screen while the graphical item traveled along the path, selecting, from among multiple liveness threshold scores, a liveness threshold score;
determining whether the correlation score satisfies the liveness threshold score; and
based on determining whether the correlation score satisfies the liveness threshold score, determining whether the user is a live person.

2. The method of claim 1, wherein:
determining whether the correlation score satisfies the liveness threshold score comprises determining that the correlation score satisfies the liveness threshold score, and determining whether the user is a live person comprises determining that the user is a live person based on determining that the correlation score satisfies the liveness threshold score.

3. The method of claim 1, wherein:
determining whether the correlation score satisfies the liveness threshold score comprises determining that the correlation score does not satisfy the liveness threshold score, and
determining whether the user is a live person comprises determining that the user is not a live person based on determining that the correlation score does not satisfy the liveness threshold score.

4. The method of claim 1, path traveled by the graphical item is a random path.

5. The method of claim 1, comprising:
tracking a movement of a head of the user while the graphical item travels along the path;
comparing the movement of the head of the user to the path traveled by the graphical item;
based on comparing the movement of the head of the user to the path traveled by the graphical item, generating a head correlation score that reflects a correlation between the movement of the head of the user and the path traveled by the graphical item; and
determining whether the head correlation score satisfies a head liveness threshold score,
wherein determining whether the user is a live person is based further on determining whether the head correlation score satisfies the head liveness threshold score.

6. The method of claim 1, wherein the graphical item travels continuously along the path.

7. The method of claim 1, wherein the graphical item travels along the path stopping at particular points along the path.

8. The method of claim 1, wherein an eye of the user reflects the light source.

9. The method of claim 1, comprising:
receiving, from an application, a request to determine whether the user is a live person; and
based on the application, determining the level of accuracy that is required for determining whether the user is a live person.

10. A system comprising:
one or more computers; and
one or more data storage apparatuses storing instructions that are operable, when executed by the one or more computers, to cause the one or more computers to perform operations comprising:
providing, for display on a screen to a user, a graphical item that travels along a path;
based on providing, for display on the screen, the graphical item, activating a light source (i) that projects light in a direction away from the screen and (ii) that is separate from the screen;
receiving, from a camera, video data that includes a representation of the user;
tracking a reflection of the light source in the video data while the graphical item travels along the path on the screen;
comparing the movement of the reflection of the light source to the path traveled by the graphical item;
based on comparing the movement of the reflection of the light source to the path traveled by the graphical item, generating a correlation score that reflects a correlation between the movement of the reflection of the light source and the path traveled by the graphical item;
determining a level of accuracy that is required for determining whether the user is a live person;
based on (i) the level of accuracy that is required for determining whether the user is a live person and (ii) a complexity of the path traveled by the graphical item or whether other objects or instructions where displayed on the screen while the graphical item traveled along the path, selecting, from among multiple liveness threshold scores, a liveness threshold score;
determining whether the correlation score satisfies the liveness threshold score; and
based on determining whether the correlation score satisfies the liveness threshold score, determining whether the user is a live person.

11. The system of claim 10, wherein:
determining whether the correlation score satisfies the liveness threshold score comprises determining that the correlation score satisfies the liveness threshold score, and
determining whether the user is a live person comprises determining that the user is a live person based on determining that the correlation score satisfies the liveness threshold score.

12. The system of claim 10, wherein:
determining whether the correlation score satisfies the liveness threshold score comprises determining that the correlation score does not satisfy the liveness threshold score, and
determining whether the user is a live person comprises determining that the user is not a live person based on determining that the correlation score does not satisfy the liveness threshold score.

13. The system of claim 10, path traveled by the graphical item is a random path.

14. The system of claim 10, wherein the operations further comprise:
tracking a movement of a head of the user while the graphical item travels along the path;
comparing the movement of the head of the user to the path traveled by the graphical item;
based on comparing the movement of the head of the user to the path traveled by the graphical item, generating a head correlation score that reflects a correlation between the movement of the head of the user and the path traveled by the graphical item; and
determining whether the head correlation score satisfies a head liveness threshold score,
wherein determining whether the user is a live person is based further on determining whether the head correlation score satisfies the head liveness threshold score.

15. The method of claim 10, wherein the graphical item travels continuously along the path.

16. The system of claim 10, wherein the graphical item travels along the path stopping at particular points along the path.

17. A non-transitory computer-readable medium storing software comprising instructions executable by one or more computers which, upon such execution, cause the one or more computers to perform operations comprising:
providing, for display on a screen to a user, a graphical item that travels along a path;
based on providing, for display on the screen, the graphical item, activating a light source (i) that projects light in a direction away from the screen and (ii) that is separate from the screen;
receiving, from a camera, video data that includes a representation of the user;
tracking a reflection of the light source in the video data while the graphical item travels along the path on the screen;
comparing the movement of the reflection of the light source to the path traveled by the graphical item;
based on comparing the movement of the reflection of the light source to the path traveled by the graphical item, generating a correlation score that reflects a correlation between the movement of the reflection of the light source and the path traveled by the graphical item;
determining a level of accuracy that is required for determining whether the user is a live person;
based on (i) the level of accuracy that is required for determining whether the user is a live person and (ii) a complexity of the path traveled by the graphical item or whether other objects or instructions where displayed on the screen while the graphical item traveled along the path, selecting, from among multiple liveness threshold scores, a liveness threshold score;
determining whether the correlation score satisfies the liveness threshold score; and
based on determining whether the correlation score satisfies the liveness threshold score, determining whether the user is a live person.

18. The medium of claim 17, wherein:
determining whether the correlation score satisfies the liveness threshold score comprises determining that the correlation score satisfies the liveness threshold score, and determining whether the user is a live person comprises determining that the user is a live person based on determining that the correlation score satisfies the liveness threshold score.

19. The medium of claim 17, wherein:

determining whether the correlation score satisfies the liveness threshold score comprises determining that the correlation score does not satisfy the liveness threshold score, and determining whether the user is a live person comprises determining that the user is not a live person based on determining that the correlation score does not satisfy the liveness threshold score.

20. The medium of claim 17, wherein the operations further comprise:

tracking a movement of a head of the user while the graphical item travels along the path;

comparing the movement of the head of the user to the path traveled by the graphical item;

based on comparing the movement of the head of the user to the path traveled by the graphical item, generating a head correlation score that reflects a correlation between the movement of the head of the user and the path traveled by the graphical item; and determining whether the head correlation score satisfies a head liveness threshold score, wherein determining whether the user is a live person is based further on determining whether the head correlation score satisfies the head liveness threshold score.

21. The medium of claim 17, wherein the graphical item travels continuously along the path.

22. The medium of claim 17, wherein the graphical item travels along the path stopping at particular points along the path.

* * * * *